April 19, 1938.  W. E. CLAUS  2,114,279
DRAFT COUPLING
Filed July 18, 1936   2 Sheets-Sheet 1
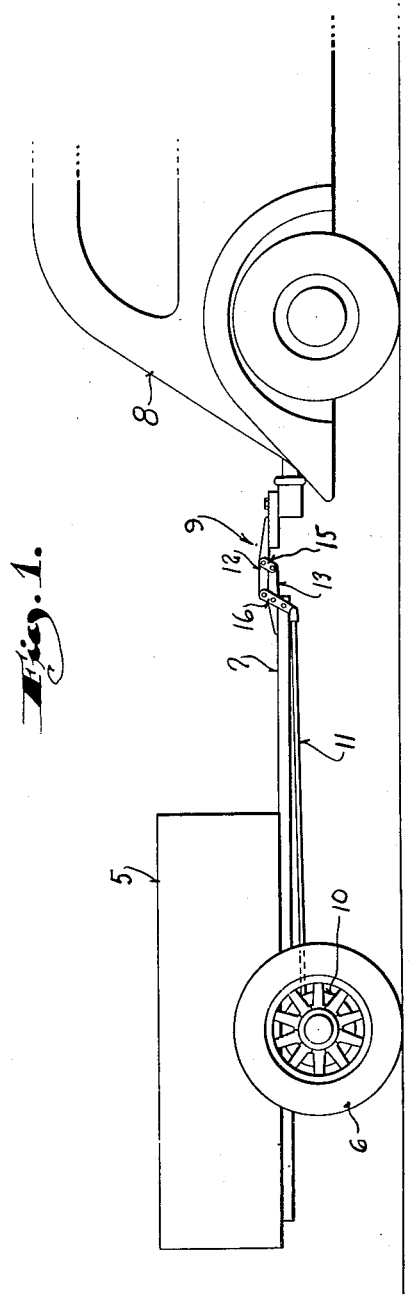
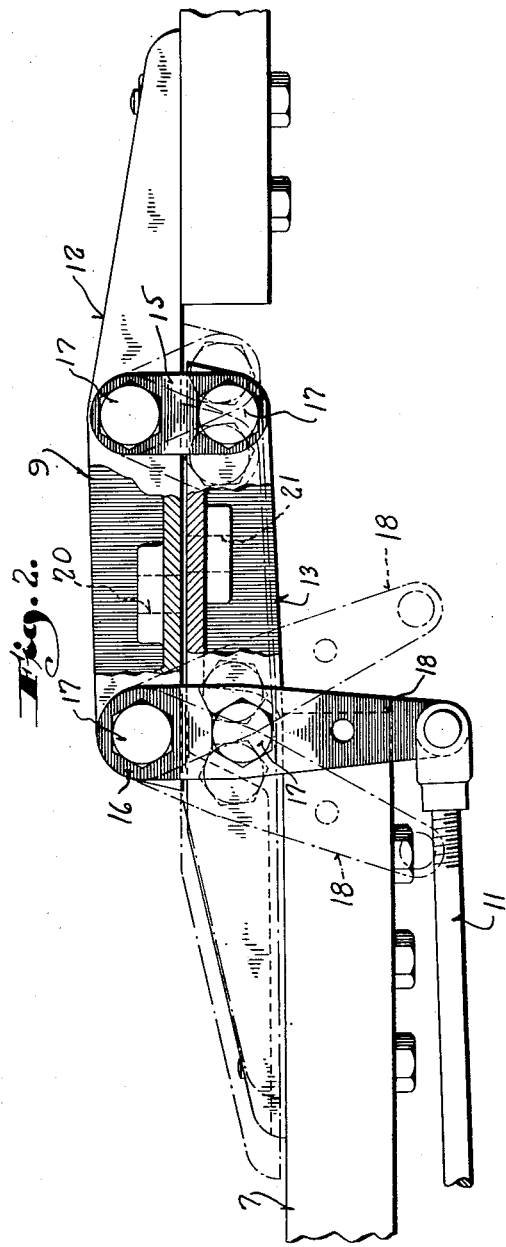
Inventor
Walter E. Claus
Attorney April 19, 1938.　　　W. E. CLAUS　　　2,114,279
DRAFT COUPLING
Filed July 18, 1936　　2 Sheets-Sheet 2
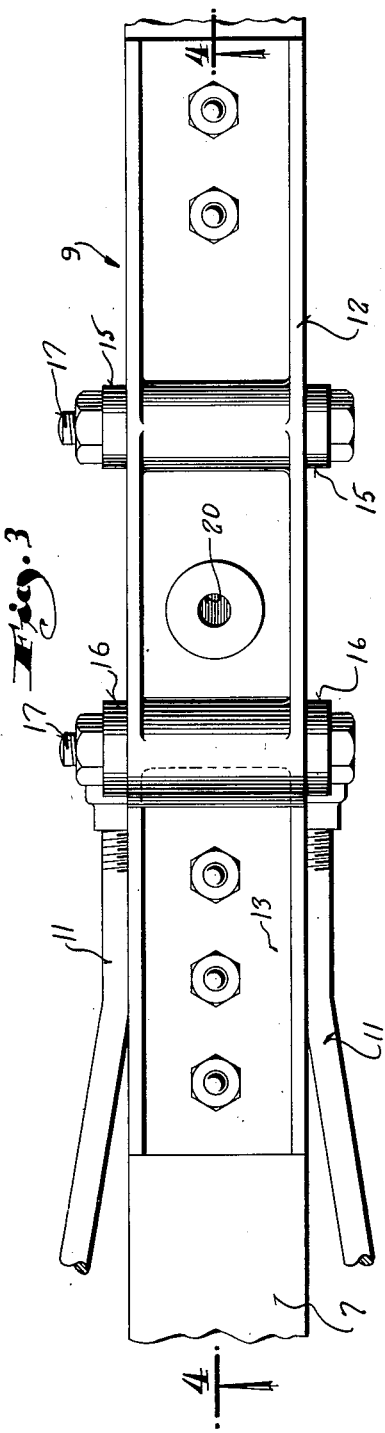
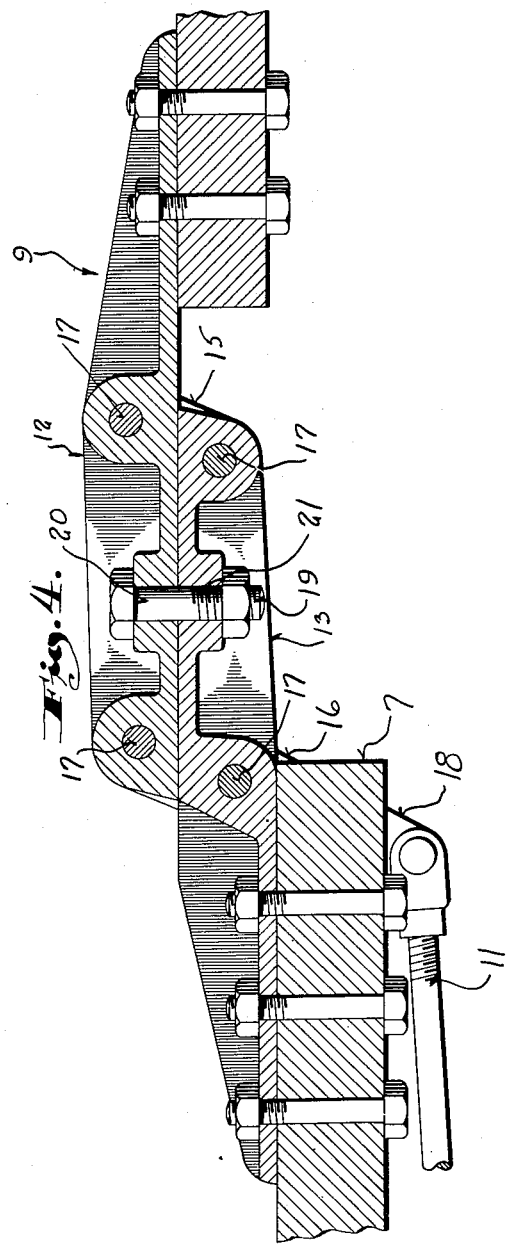
Inventor
Walter E. Claus Patented Apr. 19, 1938

2,114,279

UNITED STATES PATENT OFFICE 2,114,279

DRAFT COUPLING

Walter E. Claus, Milwaukee, Wis., assignor to Sportsman's Equipment Co., Milwaukee, Wis., a corporation of Wisconsin Application July 18, 1936, Serial No. 91,314

3 Claims. (Cl. 188—142)

This invention relates to draft couplings and refers particularly to trailer hitches for attaching a trailer to an automobile or other draft vehicle.

In the use of trailers, particularly the house or cabin type employed in touring, the additional load which the trailer imposes upon the braking equipment of the automobile often exceeds the capacity of the brakes and subjects them to tremendous wear. To overcome this difficulty, the present invention contemplates the provision of novel means, forming an inherent part of the draw-bar mechanism, for automatically applying a set of brakes with which the trailer is equipped.

In this connection it is a further object of this invention to provide a combined hitch and brake applying mechanism for trailers which incorporates relatively movable parts adapted to produce motion upon a forward surge of the trailer which motion is utilized for the application of brakes with which the trailer is equipped.

Still another object of this invention is to provide simple means for rendering the brake applying mechanism ineffective.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a side view of a trailer and the rear portion of an automobile showing the manner in which this invention is employed;

Figure 2 is an enlarged side view of the combined hitch and brake applying mechanism, parts thereof being broken away and in section;

Figure 3 is a top view of the combined hitch and brake applying mechanism; and

Figure 4 is a longitudinal sectional view through Figure 3 on the plane of the line 4—4.

Referring now more particularly to the accompanying drawings in which like numerals indicate like parts throughout the several views, the numeral 5 designates a trailer equipped with wheels 6 and a draw-bar 7. The draw-bar 7 is adapted to be attached to the rear of an automobile or other draft vehicle, indicated by the numeral 8, through the medium of the combined hitch and brake applying mechanism of this invention, indicated generally by the numeral 9. The trailer wheels 6 are equipped with brakes 10 adapted to be applied upon the exertion of a pull on brake rods 11 which extend forwardly along the draw-bar 7 to be connected to the brake applying mechanism 9.

The combined hitch and brake applying mechanism comprises two superimposed members 12 and 13 which in the present instance are formed as castings. The member 12 is adapted to be attached to the automobile in any suitable manner and the member 13 is bolted to the draw-bar 7. The members 12 and 13 are relatively movably connected by links 15 and 16 in such a manner that the composite structure forms a parallelogram. There are preferably two links 15 and two links 16, one of each pair mounted on each side of the two members 12 and 13, with the pivotal connections between the links and the members 12 and 13 provided by cross bolts 17, passing through aligned holes in the links and suitable bosses cast as integral parts of the members 12 and 13.

The parallelogram arrangement of the connected members 12 and 13 permits relative endwise movement of the members in the direction of pull, and when a pulling force is being applied, the parts take the positions shown in Figures 1 and 4. In these positions the members 12 and 13 are in flat engagement to form substantially one integral unit so that the pull is imparted from the automobile directly to the draw-bar of the trailer. Upon deceleration of the automobile and the consequent forward surge of the trailer, the member 13 moves forwardly with respect to the member 12 causing the lower ends of the links 15 and 16 to swing forwardly.

The links 16 have extensions 18 on their lower ends which swing through a considerable arc as the member 13 moves forwardly in response to the forward surge of the trailer. These link extensions 18 have the brake rods 11 attached thereto so that the forward swinging movement of the links imparts a pull on the rods to apply the brakes 10 of the trailer. The adjustment of the brakes is such that their application begins when the links are in approximately vertical position so that any forward surge of the trailer is effectually checked before the load thereof is imposed upon the automobile braking equipment.

If it is desired to render the brake applying mechanism ineffective, it is only necessary to slip a bolt 19 through holes 20 and 21 formed through the members 12 and 13, respectively, and which are in alignment when the members 12 and 13 are in the positions which they assume during the application of the pull on the draw-bar.

From the foregoing description taken in connection with the accompanying drawings, it will be readily apparent to those skilled in the art, that this invention provides a novel hitch and brake applying mechanism for trailers and that the composite elements of the mechanism are of simple, rugged construction, not easily broken and inexpensive to manufacture.

What I claim as my invention is:

1. In a trailer hitch, two superimposed members having surfaces adapted to be engaged, short and long links pivotally attached to each of said members for swingingly supporting the lower member from the upper member so as to enable relative endwise movement of said members to and from a position at which said surfaces are in engagement and said members are positively held against endwise movement apart to transmit a pull from one to the other, a brake actuating rod leading from the free end portion of the long link for actuating the brakes of a trailer with which the hitch is used upon relative endwise motion of said members incidental to forward surging of the trailer, said members having apertures adapted to be aligned when said members are in positions having their said surfaces in engagement, and a locking pin adapted to be passed through said aligned apertures to detachably secure said members against relative endwise motion.

2. In a trailer hitch, two superimposed substantially channel-shaped members of substantially the same width adapted to have the outer faces of their webs engage, a pair of short links pivotally attached to and lying flat against the flanges at the end portion of one of said members and the flanges of the medial portion of the other member, a pair of longer links pivotally attached to and lying flat against the flanges of the end portion of the second designated member and the flanges of the medial portion of the first designated member to pivotally connect said members, the distance between the pivotal connections of each set of links with the respective members being the same so that said members and links form a parallelogram to enable relative endwise movement of said members to and from a position at which the outer faces of their webs are in flat engagement and said members are positively held against endwise movement apart with a substantial part of the connecting links covering the juncture of the members to hold the same against relative lateral motion, means for connecting the second designated member with a draft vehicle, means for connecting the first designated member with a trailer, a brake actuating rod connected with the free end portions of the long links for actuating the brakes of a trailer with which the hitch is used upon forward surging of the trailer, the webs of said channel-shaped members having apertures adapted to align when said webs are in flat engagement, and a locking pin adapted to pass through said aligned apertures for detachably securing the members against relative endwise movement.

3. In a trailer hitch, two superimposed members having surfaces adapted to be engaged, links pivotally attached to each of said members for swingingly supporting the lower member from the upper member so as to enable relative endwise movement of said members to and from a position at which said surfaces are in engagement and said members are positively held against endwise movement apart to transmit a pull from one to the other, a brake actuating rod connected with one of said links for actuating the brakes of a trailer with which the hitch is used upon relative endwise motion of said members incidental to forward surging of the trailer, and means for positively securing said superimposed members against relative endwise movement.

WALTER E. CLAUS.